United States Patent [19]
de Jong et al.

[11] Patent Number: 5,542,823
[45] Date of Patent: Aug. 6, 1996

[54] RESERVOIR BODY FOR A RADIAL PLUNGER PUMP

[75] Inventors: Leendert W. C. de Jong, Oldenzaal; Arjan P. van Heiningen, Haaksbergen; Willem H. Masseling, Oldenzaal, all of Netherlands

[73] Assignee: Applied Power Inc., Butler, Wis.

[21] Appl. No.: 490,182

[22] Filed: Jun. 14, 1995

[51] Int. Cl.$^6$ .................................................. F04B 27/04
[52] U.S. Cl. ........................................ 417/273; 417/423.14
[58] Field of Search .............................. 417/273, 423.14, 417/360

[56] References Cited

U.S. PATENT DOCUMENTS

| | | | |
|---|---|---|---|
| 4,875,836 | 10/1989 | Zehnder et al. | 417/360 |
| 5,181,838 | 1/1993 | Sato et al. | 417/423.14 |
| 5,333,998 | 8/1994 | Yoshida et al. | 417/273 |

FOREIGN PATENT DOCUMENTS

| | | |
|---|---|---|
| 0274739 | 7/1988 | European Pat. Off. . |
| 593913 | 4/1994 | European Pat. Off. . |
| 1169297 | 4/1964 | Germany . |
| 7708562 | 2/1979 | Netherlands . |
| 2016599 | 9/1979 | United Kingdom . |

OTHER PUBLICATIONS

Copy of the search report of the corresponding Netherlands priority application (Applicant's Exhibit No. 1) with English version (Applicant's Exhibit No. 2).

*Primary Examiner*—Charles Freay
*Attorney, Agent, or Firm*—Quarles & Brady

[57] ABSTRACT

Pump assembly, comprising a radial plunger pump for hydraulic fluid, having a pump housing with radial cylinders formed therein, in each of which cylinders a plunger is reciprocable by means of an eccentric rotor, an electric motor with a rotary output shaft which is connected for driving purposes to the rotor of the radial plunger pump, and a reservoir body for forming a reservoir for hydraulic fluid, the radial plunger pump, the electric motor and the reservoir body being interconnected to form a unit. The reservoir body and the electric motor are fitted at the same side of the pump housing, the reservoir body being adjacent to the pump housing at one side and at the opposite side having a recess. The electric motor preferably projects over a part of its length into the recess of the reservoir body. The reservoir body is preferably designed for fixing the pump assembly to a support.

12 Claims, 3 Drawing Sheets

RESERVOIR BODY FOR A RADIAL PLUNGER PUMP

The present invention relates to a pump assembly, comprising a radial plunger pump for hydraulic fluid, having a pump housing with radial cylinders formed therein, in each of which cylinders a plunger is reciprocable by means of an eccentric rotor, an electric motor with a rotary output shaft which is connected for driving purposes to the rotor of the radial plunger pump, and a reservoir body for forming a reservoir for hydraulic fluid, the radial plunger pump, the electric motor and the reservoir body being interconnected to form a unit.

Such pump assemblies are generally known and are fitted, inter alia, in vehicles as part of a hydraulic system. For example, the use of such a pump assembly is known as part of a hydraulic system for operating a roof of a convertible car. In the case of the known pump assembly the electric motor is fitted at one side of the pump housing. A cup-shaped reservoir body is fixed at the opposite side of the pump housing, with its open side adjoining the pump housing, in order to form the reservoir for the hydraulic fluid. The reservoir body is generally made essentially of plastic, and the pump housing is made of metal. Moreover, in the case of the known pump assembly the metal pump housing is designed for fixing the pump assembly to the car or another support.

One of the disadvantages of the known pump assemblies described above is that they take up an undesirably large amount of space. It is also a disadvantage that the pump housing has to be adapted in order to be able to fit the known pump assembly on a support in various situations, such as in various types of cars. The fact is that adaptations of the metal pump housing are complex as regards production, and are expensive.

A pump assembly in which the electric motor is situated in its entirety inside the reservoir for the hydraulic oil and is in contact there with the hydraulic oil is also known. The oil in this case provides the cooling of the electric motor, but this requires a special, relatively expensive electric motor, and is therefore undesirable for many applications.

The object of the present invention is therefore first to provide a pump assembly which requires little fitting space. Another object of the invention is to provide a pump assembly which can be manufactured in a cost-saving manner in forms which are suitable for different fitting situations.

In order to achieve the first object, the present invention proposes the provision of a pump assembly according to the preamble which is characterized in that the reservoir body and the electric motor are fitted at the same side of the pump housing, in that the reservoir body is adjacent to the pump housing at one side and at the opposite side has a recess, and in that the electric motor projects into the recess of the reservoir body. This measure according to the invention provides a pump assembly which is clearly different in construction from the known and generally accepted construction, with the result that in many situations the space required for fitting the pump assembly can be utilized better. According to the invention, the electric motor is at least partially surrounded by the reservoir body, with the result that there is a negative influence on the heat emission from the electric motor to the environment. This may also explain why this arrangement of the electric motor in a recess of the reservoir body has not been proposed until now. In many applications, such as in the case of the application mentioned in the introduction for operating a convertible car roof, the radial plunger pump of the pump assembly is put into operation only now and then and for a short period in each case (for example, a few tens of seconds). The heat which has arisen in the motor during operation can then be dissipated in a period following that operation. The electric motor preferably projects over a part of its length into the recess, so that the part of the electric motor projecting from the reservoir body can emit heat unimpeded to the environment.

The reservoir body is preferably a relatively simple plastic product manufactured by injection moulding, as a result of which the reservoir body can be adapted simply as regards production by changing the injection mould once or providing a specific mould. This is considerably cheaper in all cases than setting up the production process for manufacturing metal pump housings of different types. The cost of keeping the different types of plastic reservoir bodies in stock will also be considerably lower than that of keeping different types of pump housings in stock.

It is also advantageous for the reservoir body to be equipped for fixing the pump assembly to a support. Since the reservoir body in the case of the pump assembly according to the present invention forms the central part of the pump assembly, the reservoir body can simply be of such design that it serves as a supporting bracket for the electric motor and the radial plunger pump. In the case of the known pump assembly, where the plastic reservoir body is fixed at one side of the pump assembly and the electric motor is fitted at the other side, making the reservoir body suitable as a supporting bracket would be considerably more complicated, on account of the poor force transmission in that case. It is also clear that for providing pump assemblies which are functionally identical through the fact that they comprise the same radial plunger pump and electric motor, but which must be suitable for different fitting situations, an adaptation of the reservoir body will now generally suffice.

In a particular embodiment the reservoir body is provided with external fixing members, such as projecting fixing flanges. However, the reservoir body can also be, for example, completely smooth on the outside and can then be fixed by means of a clamp construction to a support such as the vehicle body.

In an embodiment which is advantageous in practice the reservoir body is made cup-shaped and has an outer ring wall, which at one end face connects in a sealing manner to the pump housing, and at the other end face is connected by way of an end wall to an inner ring wall which extends over at least a part of the length of the outer ring wall and inside the outer ring wall, which inner ring wall at its end face facing the pump housing is provided with an inner end wall with a passage opening, so that the inner ring wall bounds the recess into which the electric motor projects with its output shaft through the passage opening. The space between the outer ring wall and the inner ring wall then forms the part of the reservoir for the hydraulic fluid lying around the electric motor.

In order to promote the cooling of the electric motor and to facilitate the fitting of the electric motor, it is advantageous for the recess bounded by the inner ring wall to be such that the electric motor projects into it with some radial play. It has also been found to be advantageous if the shape of the outer ring wall corresponds essentially to the shape of the pump housing adjacent thereto.

The electric motor is preferably fixed to the inner end wall of the reservoir body, and the pump housing is also fixed to the inner end wall of the reservoir body. In particular in the case of the embodiment in which the reservoir body serves as a bracket for the pump and the motor, this means that any stresses occurring are effectively absorbed and transmitted.

It is advantageous for the strength of the reservoir body if the reservoir body comprises connecting members extending between the outer ring wall and the inner ring wall.

The inner end wall is advantageously provided with a seal for the output shaft of the electric motor, said seal lying around the passage opening. This means that the electric motor can be of a simple design without seal.

In order to improve the cooling of the electric motor, the outer ring wall and the inner ring wall can be interrupted at least at one point and be connected there by a wall which bounds a convection opening.

In an advantageous embodiment the outer ring wall and the inner ring wall are interrupted in a slit shape at points lying diametrically opposite each other, in order to form convection slits extending from the free end face of the reservoir body to the inner end wall.

In an embodiment which is very advantageous in practice the electric motor has a cylindrical outer jacket running coaxially with the output shaft, and the outer ring wall and the inner ring wall are coaxial cylindrical walls. Bar-shaped or tubular electric motors are generally known standard parts, which are cheap and are also already widely used for driving hydraulic plunger pumps. Since the pump housing of many radial plunger pumps is preferably cylindrical in design, the reservoir body provided according to this measure leads to optimum utilization of the fitting space.

The invention will be explained in greater detail below with reference to exemplary embodiments of the pump assembly according to the invention shown in the drawing. In the drawing.

Figure 1:
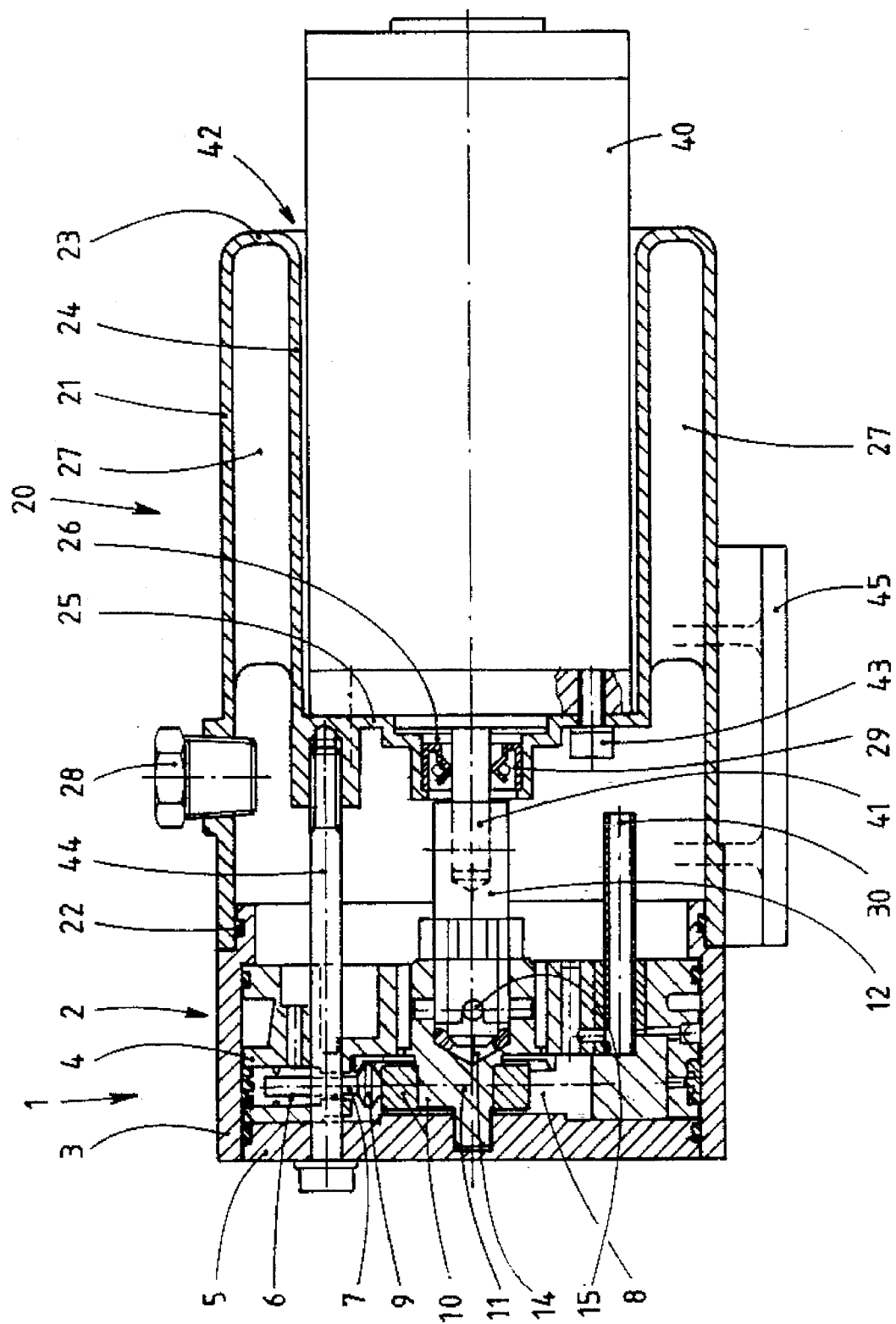
FIG. 1 shows a longitudinal section of a first exemplary embodiment of a pump assembly according to the invention along the line I—I in FIG. 2.
Figure 3:
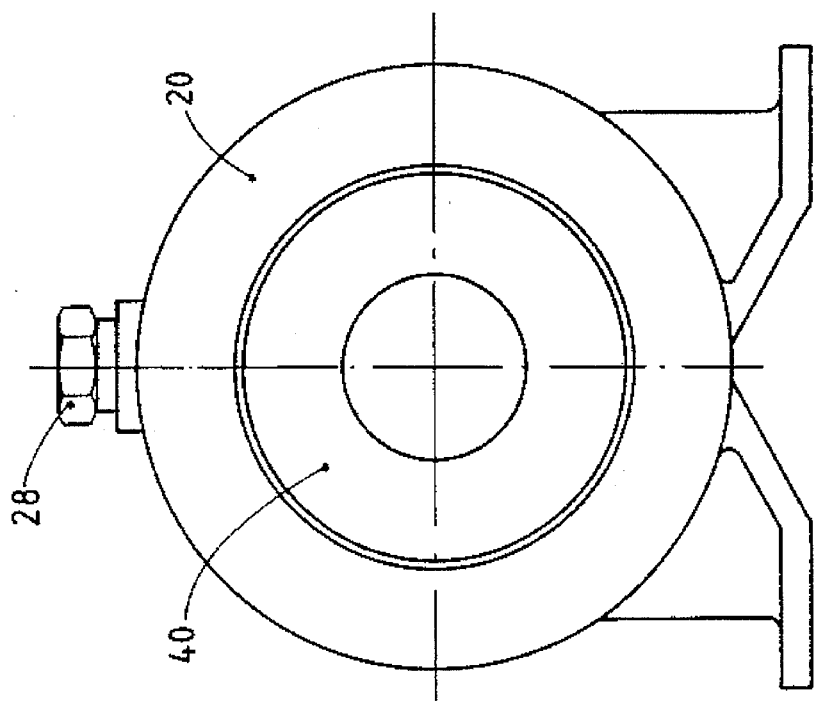
FIG. 3 shows a rear view of the pump assembly in FIG. 1.
Figure 2:
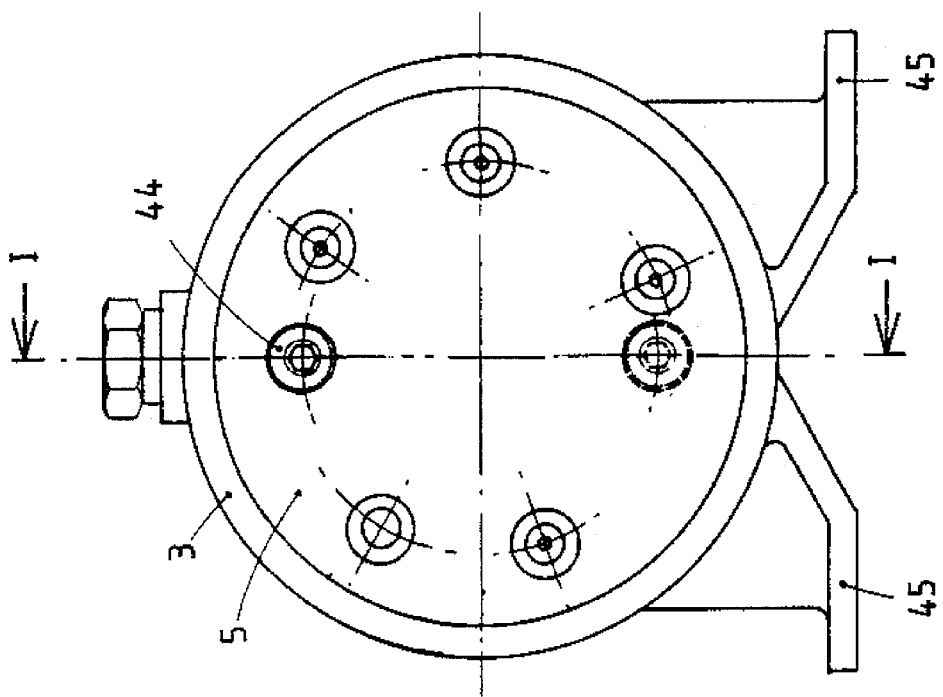
FIG. 2 shows a front view of the pump assembly in FIG. 1.

The pump assembly according to the invention shown in FIGS. 1–3 comprises a radial plunger pump 1 with a metal pump housing 2, consisting of a cylindrical metal surface ring 3, in which an inner disc element 4 and a cover 5 are placed. Several radially oriented cylinders 6 are formed in the inner disc element 4, while a cylindrical plunger 7 is reciprocably in each cylinder 6.

The inner disc element 4 surrounds a central space 8, into which the radial inner ends—which are provided with thickened parts 9—of the plungers 7 project, and in which the eccentric part 10 of the rotor indicated by 11 is situated. The central space 8 is shut off by the cover 5.

A connecting shaft 12, for example made of plastic, which acts upon a cross part 15 disposed in a central bore 14 in the central part of the rotor 7, projects into the rotor 11 of the radial plunger pump. The rotation of the connecting shaft 12 is consequently transmitted to the rotor 11. The remaining design and operation of the radial plunger pump 1 shown is not relevant for the explanation of the present invention and will not be explained any further here.

The pump assembly also comprises a reservoir body 20 which is manufactured as a plastic injection moulded product and is made essentially cup-shaped. The body 20 comprises a cylindrical outer annular wall 21, which at an end face sealed off by a sealing ring 22 connects to the likewise cylindrical pump housing 2, and at the other end face is connected by means of an end wall 23 to a cylindrical inner ring wall 24. The inner ring wall 24 is coaxial with the outer ring wall 21 and extends over a part of the length of the outer ring wall 21 in the direction of the pump housing 2 inside the outer ring wall 21. At its end face facing the pump housing 2 the inner ring wall 24 is provided with an inner end wall 25 which has a passage opening 26. Between the inner ring wall 24 and the outer ring wall 21 radial connecting members 27 are present, in order to increase the strength of the reservoir body 20. The reservoir body 20 has a filling cap 28 for filling the hollow formed by the reservoir body 20 and the pump housing 2 with hydraulic oil. The suction opening of the radial plunger pump 1 for the oil from the reservoir is indicated at 30.

Finally, the pump assembly comprises an electric motor 40 for driving the plunger pump 1. The electric motor 40 preferably used is of the type which is known as a standard component, which has an essentially closed cylindrical metal outer jacket, which is coaxial with output shaft 41 of the electric motor 40. The electric motor 40 projects over a considerable part of its length into the recess 42 formed in the reservoir body 20 by the inner ring wall 24 and the end wall 25. The electric motor 40 is fixed to the end wall 25 at its insertion end by means of bolts 43. The pump housing 2 is also fixed by means of bolts 44 to the end wall 25 of the reservoir body 20, so that it now serves as a bracket for the pump 1 and the motor 40. The rotary output shaft 41 projects through the flexible sealing ring 29 disposed around the passage opening 26, so that the motor can be a simple and cheap type without fluid seal.

For fixing the pump assembly to a support, for example the body of a car, the reservoir body 20 in this example is provided with fixing flanges 45 on the outside. It is clear that the reservoir body 20 in this arrangement can serve without any problem as the supporting bracket for the pump 1 and the electric motor 40. In order to provide functionally identical pump assemblies which are suitable for various fitting situations, it will suffice to manufacture reservoir bodies from various kinds of plastic. The plastic reservoir bodies can be manufactured cheaply and held in stock.

Figure 4:
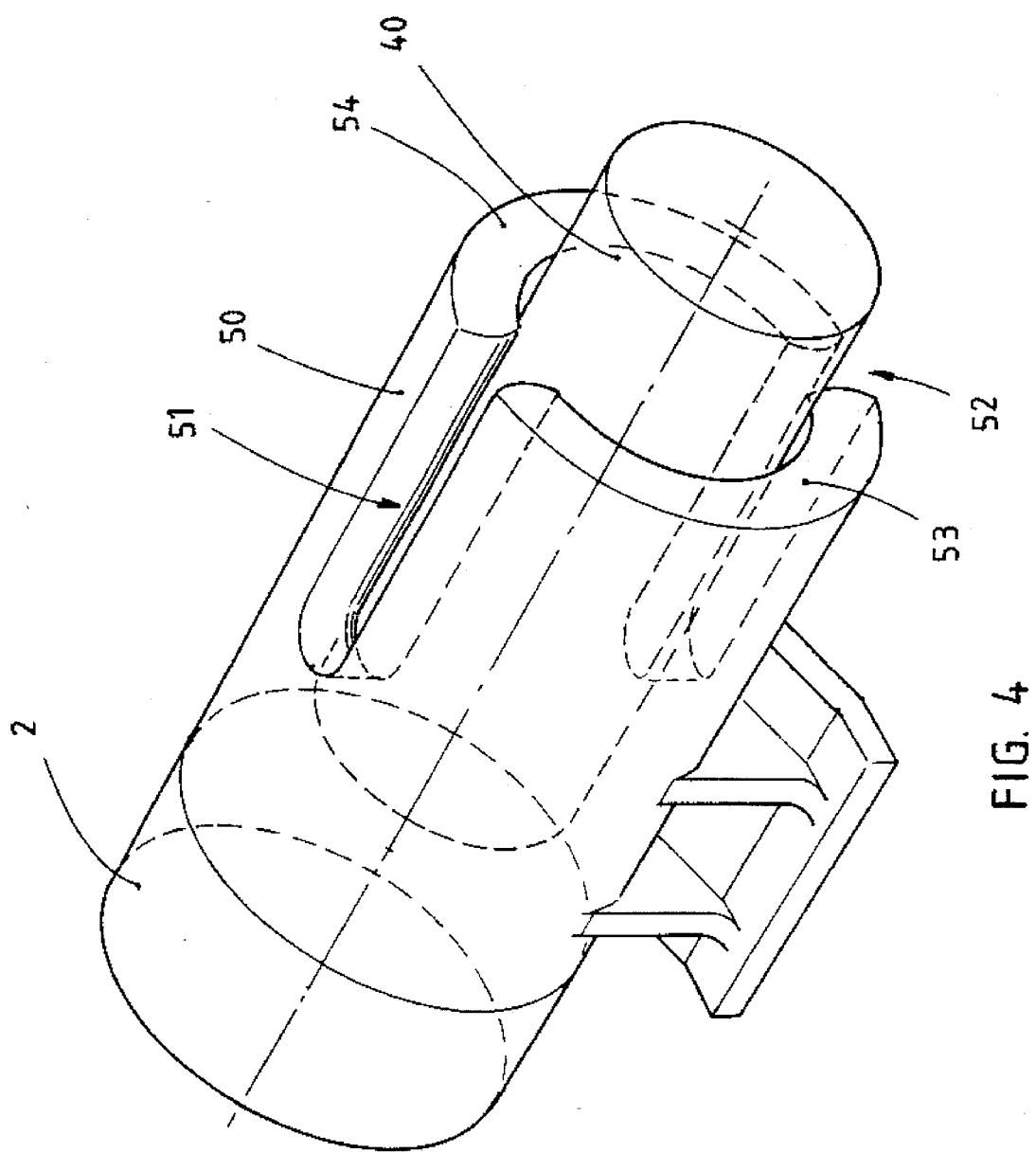
FIG. 4 shows a diagrammatic view in perspective of a second exemplary embodiment of a pump assembly according to the invention.

FIG. 4 shows a variant of the pump assembly from FIGS. 1–3, in which the same parts are indicated by the same reference numbers. The pump assembly in FIG. 4 differs from the pump assembly shown in FIGS. 1–3 in that provision is made for improved convection cooling of the electric motor 40. For this purpose, the reservoir body 50, which is essentially identical to the plastic reservoir body 20 in FIGS. 1–3, bounds convection slits 51 and 52 at the top side and the bottom side of the pump assembly, which is generally fitted in a horizontal position. Since a space is left free between the outside wall of the electric motor 40 and the wall of the reservoir body 50 surrounding it, a free convection flow is produced from the bottom upwards along the electric motor, with the result that the latter is cooled. In fact, the reservoir body 50 forms two reservoir parts 53 and 54 with a kidney-shaped crosssection, which lie around the electric motor 40 and form a recess therefor. This shape of reservoir body 50 can be manufactured simply in an injection moulding process. Of course, a different number of convection slits or differently shaped openings can also be provided.

In a variant (not shown) of the reservoir body from FIG. 4 the slits on the outer periphery of the reservoir bodies can be closed, i.e. the outer ring wall continues at that point. The slits then form channels which are open towards the free end face of the reservoir bodies, with the result that better cooling than that of the variant shown in FIGS. 1–3 is again obtained.

What is claimed is:

1. Pump assembly, comprising a radial plunger pump for hydraulic fluid, having a pump housing with radial cylinders formed therein, in each of which cylinders a plunger is reciprocable by means of an eccentric rotor, an electric motor with a rotary output shaft which is connected for driving purposes to the rotor of the radial plunger pump, and a reservoir body for forming a reservoir for hydraulic fluid, the radial plunger pump, the electric motor and the reservoir body being interconnected to form a unit, wherein the reservoir body and the electric motor are fitted at the same side of the pump housing, the reservoir body is adjacent to the pump housing at one side and at the opposite side has a recess, and the electric motor projects into the recess of the reservoir body.

2. Pump assembly according to claim 1, wherein the reservoir body is provided with mounting elements for mounting the pump assembly on a support.

3. Pump assembly according to claim 1, wherein the reservoir body is cup-shaped and has an outer ring wall, which at one end face connects in a sealing manner to the pump housing, and at the other end face is connected by way of an end wall to an inner ring wall which extends over at least a part of the length of the outer ring wall and inside the outer ring wall, which inner ring wall at its end face facing the pump housing is provided with an inner end wall with a passage opening, so that the inner ring wall bounds the recess into which the electric motor projects with its output shaft through the passage opening.

4. Pump assembly according to claim 3, wherein the electric motor is fixed to the inner end wall of the reservoir body.

5. Pump assembly according to claim 3, wherein the pump housing is fixed to the inner end wall of the reservoir body.

6. Pump assembly according to claim 3, wherein the reservoir body comprises connecting members extending between the outer ring wall and the inner ring wall.

7. Pump assembly according to claim 3, wherein the inner end wall is provided with a seal for the output shaft of the electric motor, said seal lying around the passage opening.

8. Pump assembly according to claim 3, wherein the electric motor has a cylindrical outer jacket running coaxially with the output shaft, and the outer ring wall and the inner ring wall of the reservoir body are coaxial cylindrical walls.

9. Pump assembly according to claim 3, wherein the outer ring wall and the inner ring wall are interrupted at least at one point and are connected there by a wall which bounds a convection opening.

10. Pump assembly according to claim 9, wherein the outer ring wall and the inner ring wall are interrupted in a slit shape at points lying diametrically opposite each other, in order to form convection slits extending from the free end face of the reservoir body to the inner end wall.

11. Pump assembly according to claim 1, wherein the electric motor projects over a part of its length into the recess.

12. Pump assembly according to claim 1, wherein the recess is such that the electric motor projects into it with radial play.

* * * * *